US011088654B2

(12) United States Patent
Zuritis

(10) Patent No.: US 11,088,654 B2
(45) Date of Patent: Aug. 10, 2021

(54) DUAL PILE CAP

(71) Applicant: Solar Foundations USA, Inc., New Castle, DE (US)

(72) Inventor: Michael Zuritis, Ballston Lake, NY (US)

(73) Assignee: SOLAR FOUNDATIONS USA, INC., New Castle, DE (US)

( * ) Notice: Subject to any disclaimer, the term of this patent is extended or adjusted under 35 U.S.C. 154(b) by 20 days.

(21) Appl. No.: 16/653,030

(22) Filed: Oct. 15, 2019

(65) Prior Publication Data

US 2021/0111664 A1 Apr. 15, 2021

(51) Int. Cl.

| | |
|---|---|
| *H02S 20/10* | (2014.01) |
| *H02S 30/10* | (2014.01) |
| *E02D 27/16* | (2006.01) |
| *E04H 6/02* | (2006.01) |
| *H02S 20/23* | (2014.01) |
| *E02D 5/22* | (2006.01) |
| *E02D 27/14* | (2006.01) |

(Continued)

(52) U.S. Cl.
CPC .............. *H02S 20/10* (2014.12); *E02D 5/223* (2013.01); *E02D 5/72* (2013.01); *E02D 27/14* (2013.01); *E02D 27/16* (2013.01); *E02D 27/42* (2013.01); *E04H 6/025* (2013.01); *F24S 25/12* (2018.05); *F24S 25/65* (2018.05); *H02S 20/23* (2014.12); *H02S 30/10* (2014.12); *E04C 2003/0486* (2013.01)

(58) Field of Classification Search
CPC .... F24J 2/525; E04H 12/223; E04H 12/2215; H02S 20/10; H02S 20/23; H02S 30/10; E02D 5/72; F24S 25/12; F24S 25/65; F24S 2025/01; F24S 2025/014
USPC ............ 248/156, 530; 405/255; 52/73, 93.1, 52/93.2, 126.3, 126.4, 169.13, 165, 296
See application file for complete search history.

(56) References Cited

U.S. PATENT DOCUMENTS 3,108,664 A * 10/1963 Vawter .................. E04H 1/1266
52/296
8,511,021 B2 * 8/2013 Salisbury ................ E02D 5/223
52/296

(Continued)

FOREIGN PATENT DOCUMENTS

AT 518613 A1 * 11/2017 .................. F24J 2/04
CA 2817550 A1 * 12/2013 .............. F24S 25/61

(Continued)

OTHER PUBLICATIONS 7 page ODF or machine translation of CN 290585740-U published Nov. 2019. (Year: 2019).*

(Continued)

*Primary Examiner* — Robert Canfield
(74) *Attorney, Agent, or Firm* — Schmeiser, Olsen & Watts, LLP

(57) ABSTRACT

A solar array support structure includes a first vertical pile extending from a ground to a first pile end, a second vertical pile extending from the ground to a second pile end, and a first pile cap attached to each of the first and second vertical piles, the first pile cap configured to account for a misalignment of at least one of the first vertical pile and the second vertical pile by providing for adjustable attachment locations for each of the first and second pile ends.

18 Claims, 5 Drawing Sheets

(51) Int. Cl.
  *E02D 27/42*    (2006.01)
  *E02D 5/72*     (2006.01)
  *F24S 25/65*    (2018.01)
  *F24S 25/12*    (2018.01)
  *E04C 3/04*     (2006.01)

(56) References Cited

U.S. PATENT DOCUMENTS

| | | | | |
|---|---|---|---|---|
| 8,939,143 | B2* | 1/2015 | Zuritis | F24S 25/60 |
| | | | | 126/569 |
| 9,447,991 | B2* | 9/2016 | De Welle | H02S 20/00 |
| 10,128,791 | B2* | 11/2018 | Ludwig | F24S 25/636 |
| 2004/0115008 | A1* | 6/2004 | Merjan | E02D 27/14 |
| | | | | 405/253 |
| 2013/0037088 | A1* | 2/2013 | Thurner | F24S 25/70 |
| | | | | 136/251 |
| 2014/0356076 | A1* | 12/2014 | Hale | E02D 5/54 |
| | | | | 405/255 |
| 2016/0047137 | A1* | 2/2016 | Aagerup | E02D 27/42 |
| | | | | 248/530 |
| 2017/0179870 | A1* | 6/2017 | Zante | H02S 20/23 |

FOREIGN PATENT DOCUMENTS

| | | | | |
|---|---|---|---|---|
| CN | 209585740 U | * | 11/2019 | |
| CN | 210246669 U | * | 4/2020 | |
| DE | 102010005098 A1 | * | 7/2011 | H02S 20/10 |
| DE | 102012104663 A1 | * | 12/2013 | E04H 6/025 |
| DE | 202019104285 U1 | * | 9/2019 | H02S 30/00 |
| FR | 2959555 A1 | * | 11/2011 | |
| FR | 2976057 A1 | * | 12/2012 | F24S 25/37 |
| JP | 2010059743 A | * | 3/2010 | E01D 21/00 |
| JP | 2017028889 A | * | 2/2017 | F24S 25/70 |
| KR | 10-1936066 | * | 1/2019 | |

OTHER PUBLICATIONS 13 page PDF of translation of KR 1936066 B1 to Park, published Apr. 2019. (Year: 2019).*

* cited by examiner

DUAL PILE CAP

FIELD OF TECHNOLOGY

The subject matter disclosed herein relates generally to solar arrays. More particularly, the subject matter relates to a dual pile cap for connecting a vertical pile with additional support structure for supporting a solar array.

BACKGROUND

Renewable energy sources are becoming more popular with the rising cost of oil and other non-renewable energy resources. Solar energy is one of the renewable energy sources and has proven desirable to harness. One method of harnessing solar energy is to install a ground-mount structural array of solar panels, or a solar array, such that the solar panels each face the sun to achieve sunlight absorption. Many types of ground-mount structures exist that can be installed in the ground and provide support for solar arrays facing the sun. Sometimes these ground-mount structures serve no other purpose than to provide support for a solar array. In other examples, ground-mount structures could serve other purposes, such as providing a protective covering for a carport. Whatever the embodiment, ground-mount structures require the installation of one or more vertical piles that are installed and secured in the ground deep enough to provide a sufficient foundation upon which to build the rest of the ground-mount structure.

SUMMARY

A first aspect relates to a solar array support structure comprising a first vertical pile extending from a ground to a first pile end; a second vertical pile extending from the ground to a second pile end; and a first pile cap attached to each of the first and second vertical piles, the first pile cap configured to account for a misalignment of at least one of the first vertical pile and the second vertical pile by providing for adjustable attachment locations for each of the first and second pile ends.

A second aspect relates to a solar array support structure comprising: a first vertical column extending between a top end and a bottom end; a second vertical column extending between a top end and a bottom end; a third vertical column extending between a top end and a bottom end, wherein the third vertical column extends between the top end of the first vertical column and the bottom end of the second vertical column; a horizontal beam attached to and extending a length between a first end and a second end, the length extending across the top ends of each of the first, second and third vertical columns; a solar array mounted above the horizontal beam; a first vertical pile extending from a ground to a first pile end; a second vertical pile extending from the ground to a second pile end; a first pile cap attached to each of the first and second vertical piles, the bottom end of the first vertical column attached to the first pile cap; a third vertical pile extending from the ground to a third pile end; a fourth vertical pile extending from the ground to a fourth pile end; and a second pile cap attached to each of the third and fourth vertical piles, the bottom end of each of the second and third vertical columns attached to the second pile cap.

A third aspect relates to a method of installing a solar array support structure comprising: installing a first vertical pile into a ground and extending from the ground to a first pile end; installing a second vertical pile into the ground and extending from the ground to a second pile end; ensuring the first pile end is aligned vertically with the second pile end; attaching a first plate to the first pile end and a second plate to the second pile end; and attaching the first plate and the second plate to a column cap that extends between each of the first vertical pile and the second vertical pile.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
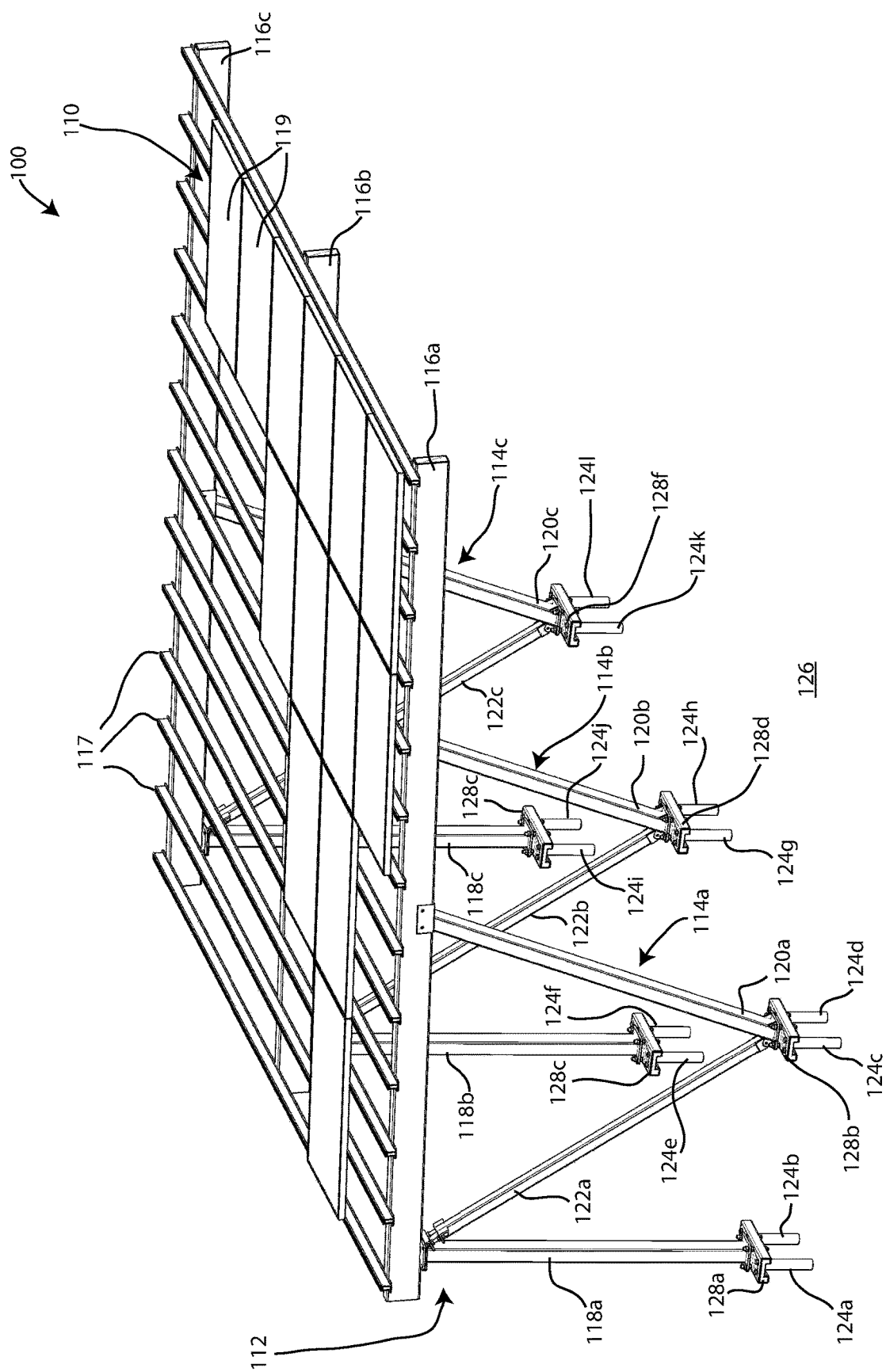
FIG. 1 depicts a perspective view of a car port solar array support structure, in accordance with one embodiment.

FIG. 1 depicts a perspective view of a car port solar array support structure 100, in accordance with one embodiment. The car port solar array support structure 100 includes a partial solar array 110 mounted to a support structure 112 comprising three cantilever structures 114*a*, 114*b*, 114*c*. Each of the cantilever structures 114*a*, 114*b*, 114*c* comprise a respective horizontal beam 116*a*, 116*b*, 116*c*. Attached above the horizontal beams 116*a*, 116*b*, 116*c* are a plurality of rails 117 spaced apart along a length of the horizontal beams 116*a*, 116*b*, 116*c*. The rails 117 may be configured to receive the individual solar panels 119 of the partial solar array 110 as shown. While only some of the solar panels 119 are shown attached to the support structure 112, it should be understood that additional solar panels 119 are mountable to complete an entire top surface of the car port solar array support structure 100. Further, while three cantilever structures 114*a*, 114*b*, 114*c* are shown in the car port solar array support structure 100 it should be understood that as few as two of the cantilever structures may be define a single-space carport or more than three cantilever structures may be utilized to create more than two carport spaces. The carport spaces defined by the car port solar array support structure 100 may be dimensioned large enough to span a width greater than a width of an intended vehicle or vehicles meant to be parked within the carport spaces.

Each of the respective horizontal beams 116*a*, 116*b*, 116*c* are held by a first column 118*a*, 118*b*, 118*c* that extends vertically along a back side of the support structure 112. Each of the respective horizontal beams 116*a*, 116*b*, 116*c* are also held by a second column 120*a*, 120*b*, 120*c* and third column 122*a*, 122*b*, 122*c* that extend in a V-shape. The car port solar array support structure 100 includes a plurality of vertical piles 124*a*, 124*b*, 124*c*, 124*d*, 124*e*, 124*f*, 124*g*, 124*h*, 124*i*, 124*j*, 124*k*, 124*l* (referred to generally as 124) each extending from a ground 126. Each pair of the vertical piles 124 are attached to a pile cap 128*a*, 128*b*, 128*c*, 128*d*, 128*e*, 128*f* (referred to generally as 114).

The first cantilever structure 114*a* includes the first column 118*a* extending from the pile cap 128*a* which is attached to the pair of vertical piles 124*a*, 124*b*. The third column 122*a* extends from a top of the first column 118*a* to the bottom of the second column 120*a*. The bottoms of the second and third columns 120*a*, 122*a* are attached to the pile cap 128*b*. The pile cap 128*b* is attached to the pair of vertical piles 124*c*, 124*d*. Similarly, the second cantilever structure 114*b* includes the first column 118*b* extending from the pile cap 128*c* which is attached to the pair of vertical piles 124*e*, 124*f* The third column 122*b* extends from a top of the first column 118*b* to the bottom of the third column 120*b*. The bottoms of the second and third columns 120*b*, 122*b* are attached to the pile cap 128*d*. The pile cap 128*d* is attached to the pair of vertical piles 124*g*, 124*h*. The third cantilever structure 114*c* also includes the first column 118*c* extending from the pile cap 128*e* which is attached to the pair of vertical piles 124*i*, 124*j*. The third column 122*c* extends from a top of the first column 118*c* to the bottom of the second column 120*c*. The bottoms of the second and third columns 120*c*, 122*c* are attached to the pile cap 128*f* The pile cap 128*f* is attached to the pair of vertical piles 124*k*, 124*l*.

Figure 2:
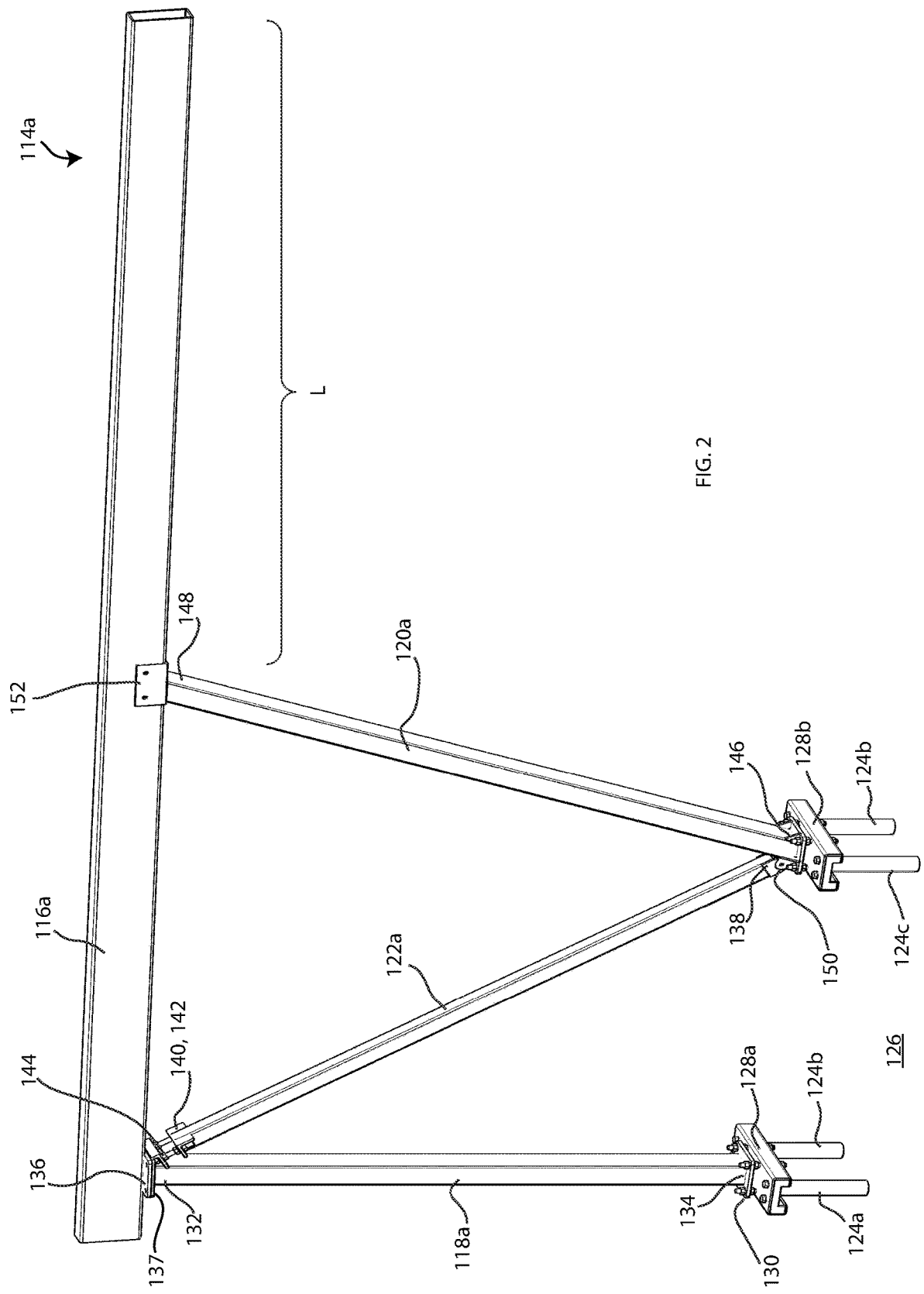
FIG. 2 depicts a cantilever structure of the car port solar array support structure of FIG. 1, in accordance with one embodiment.

FIG. 2 depicts the first cantilever structure 114*a* of the car port solar array support structure 100 of FIG. 1, in accordance with one embodiment. The first cantilever structure 114*a* is exemplary of any of the cantilever structures 114*a*, 114*b*, 114*c* described herein. The first cantilever structure 114*a* includes the horizontal beam 116*a* that includes a substantial length L that extends past the second vertical column 120*a*. The length L may be sufficient to cover the span of a length of a vehicle intended to be parked under the space defined by the car port solar array support structure 100.

The first cantilever structure 114*a* is shown having the first column 118*a* extending vertically from the pile cap 128*a* from a bottom end 130 to a top end 132. The bottom end 130 is shown including a bottom mating plate 134 for mating, attaching, connecting or otherwise coupling to the pile cap 128*a*. The top end 132 is shown including a top beam attachment plate 136 for mating, attaching, connecting or otherwise coupling the top end 132 to the horizontal beam 116*a*. The top and bottom plates 134, 136 may each include a number of openings configured to receive a bolt for providing the respective coupling. The top and bottom plates 134, 136 may each be plates that are welded or otherwise permanently integrated into the ends of the first column 118*a*.

The top beam attachment plate 136 may be configured to mate, attach, connect or otherwise couple to a plate 137 welded to the bottom of the horizontal beam 116*a*. In some embodiments, the top beam attachment plate 136 may arranged in a plane that is perpendicular to the center axis of the vertical first column 118*a*. This may create an arrangement where the horizontal beam 116*a* extends perfectly horizontally with respect to the ground 126 and/or the vertical first column 118*a*. In other embodiments, the horizontal beam 116*a* may be sloped upward or downward by one or more degrees (e.g. +/−5 degree slope). In this embodiment, the top beam attachment plate 136 may be sloped relative to the center axis of the vertical first column 118*a*.

The third column 122*a* extends from the pile cap 128*b* from a bottom end 138 to a top end 140. The top end 140 of the third column 122*a* includes a mating plate 142 which provides a surface to bolt the top end 140 of the third column 122*a* to the mating plate 136 of the first column 118*a*. The mating plate 142 may be welded or otherwise permanently integrated into the end 140 of the third column 122*a*. A coupling device 144 may include a plate and two bolts that attach, mate, connect or otherwise couple the mating plate 136 of the top end 132 of the first column 118*a* with the mating plate 142 of the top end 140 of the third column 122*a*. The coupling bolts may extend parallel to the angle of the third column 122*a*.

The second column 120*a* extends from the pile cap 128*b* from a bottom end 146 to a top end 148. The bottom end 146 of the second column 120*a* includes a mating plate 150. The mating plate 150 may be welded or otherwise permanently integrated into the end 146 of the second column 120*a*. The mating plate 150 includes a receiving location, shown in more detail in FIG. 5 and described herein below. The mating plate 150 includes two opposing gussets for receiving the bottom end 146 therebetween. The mating plate 150 may further be configured for mating, attaching, connecting or otherwise coupling the second and third columns 120*a*, 122*a* to the pile cap 128*b*. Specifically, the mating plate 150 may include a plurality of openings to receive bolts for attaching the mating plate 150 to the pile cap 128*b*. The top end 148 of the second column 120*a* is shown including a U-shaped beam attachment plate 152 for mating, attaching, connecting or otherwise coupling the top end 148 to the horizontal beam 116*a*. The U-shaped beam attachment plate 152 includes two openings on each side of the horizontal beam 116*a* configured to receive a bolt for providing the respective coupling to the horizontal beam 116*a*.

Figure 3:
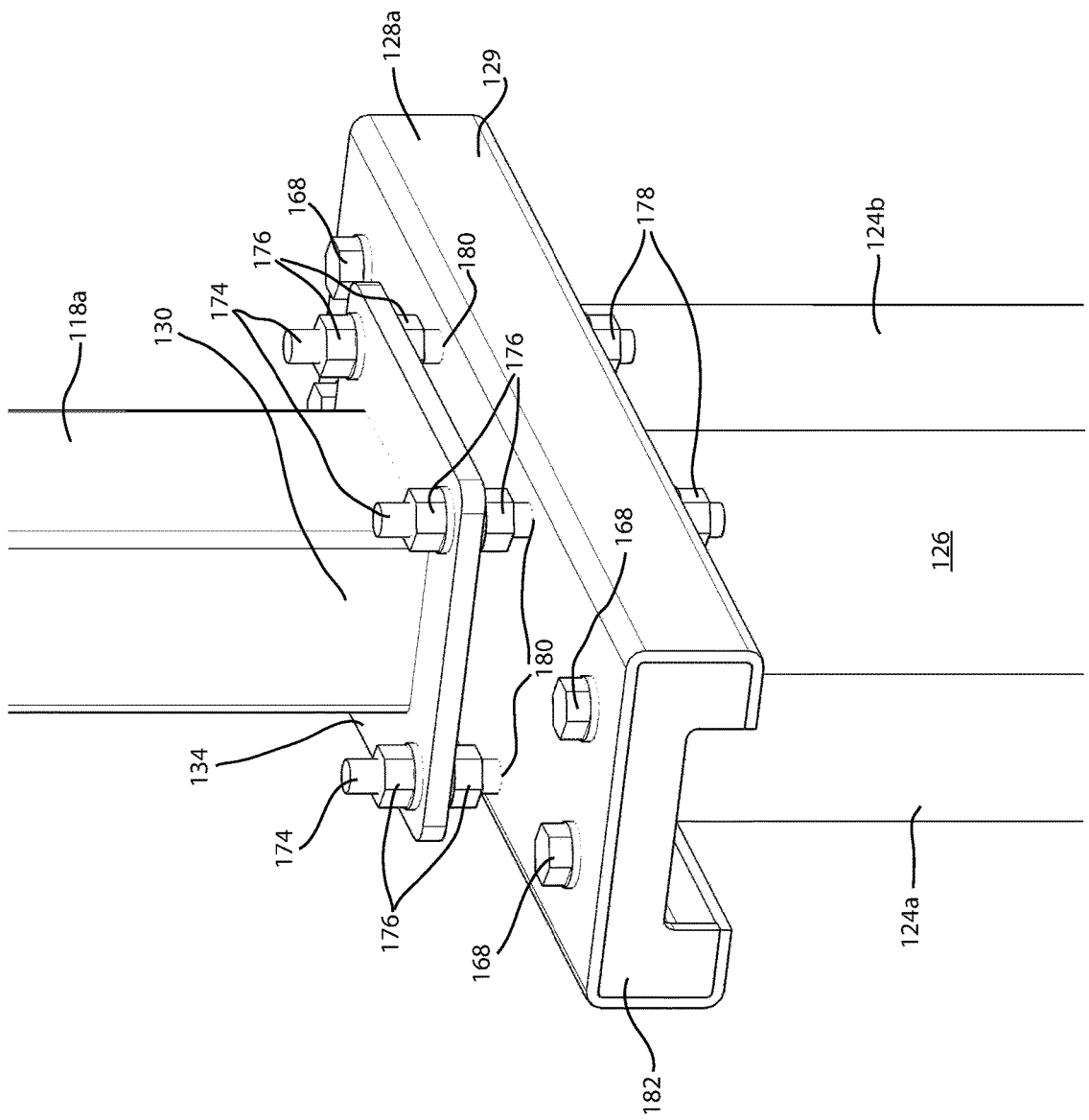
FIG. 3 depicts a perspective view of a pile cap of the car port solar array support structure of FIG. 1, in accordance with one embodiment.
Figure 4:
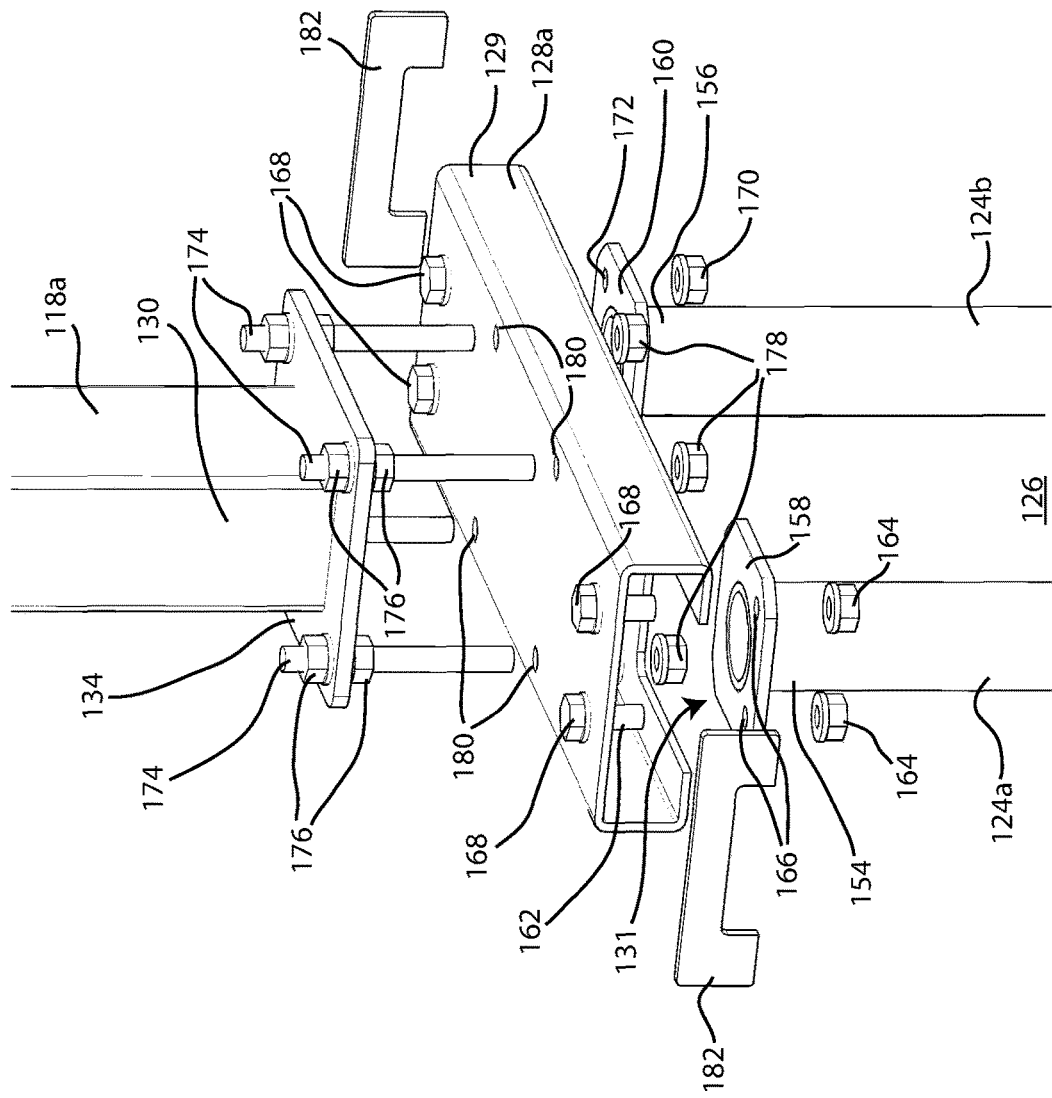
FIG. 4 depicts an exploded view of the pile cap of FIG. 3, in accordance with one embodiment.

FIG. 3 depicts a perspective view of the pile cap 128*a* of the car port solar array support structure 100 of FIG. 1, in accordance with one embodiment. FIG. 4 depicts an exploded view of the pile cap 128*a* of FIG. 3, in accordance with one embodiment. The pile cap 128*a* may be configured to account for misalignment of one or both of the vertical piles 124*a*, 124*b* by providing adjustability in the attachment location of the vertical piles 124*a*, 124*b* to the pile cap 128*a*.

The pile cap 128*a* includes a main body 129 that may be fashioned from a length of extruded or drawn metal that has a cross sectional shape that is a hollow rectangle having rounded edges. Covers 182 are located at each end of the main body 129 to enclose the hollow rectangle when assembled. Other shapes are contemplated, such as non-rounded edges. At a bottom side of the pile cap 128*a*, a U-shaped cutout portion 131 is cut away from the body at each end. This U-shaped cutout portions 131 each may be dimensioned to receive the diameter of the respective vertical piles 124*a*, 124*b*. The U-shaped cutout portions 131 may be a larger opening than the diameter of the vertical piles 124*a*, 124*b* in both length and width in order to accommodate for misalignment of the vertical piles 124*a*, 124*b* and allow for some positional adjusting of the vertical piles 124*a*, 124*b* relative to the position of the pile cap 128*a* depending on the relative positions of the vertical piles 124*a*, 124*b* to each other. The U-shaped cutout portions 131 may account for unwanted but unavoidable lateral movement of the vertical piles 124*a*, 124*b* during the driving of the vertical piles 124*a*, 124*b* into the ground caused by subsurface obstructions like rocks or roots. Thus, while the ideal position between the vertical piles 124*a*, 124*b* may be known, the U-shaped cutout portions 131 may allow for this ideal position to be off in any direction by a tolerable amount defined by the amount of relative movement allowed by the vertical piles 124a, 124b within the U-shaped cutout portions 131 prior to attachment.

As shown, the first vertical pile 124a includes a first pile end 154 extending from the ground 126. The second vertical pile 124b includes a second pile end 156 extending from the ground 126. Each of the first and second vertical piles 124a, 124b may include a substantial length that is under the ground 126 and hidden from view such that the first and second vertical piles 124a, 124b provide stability to the car port solar array support structure 100 and do not become unearthed during use. The underground ends of the vertical piles 124a, 124b may include a helical structure and/or a pointed tip or the like, in order to facilitate driving the vertical piles 124a, 124b into the ground 126.

The first pile end 154 of the first vertical pile 124a includes a first pile plate 158 attached thereto while the second pile end 154 of the second vertical pile 124 includes a second pile plate 160 attached thereto. The first and second pile plates 158, 160 may each be welded, attached or otherwise integrated to the respective ends 154, 156 of the respective piles 124a, 124b. In one embodiment, the first and second vertical piles 124a, 124b may be driven into the ground and a cut such that the plates 158, 160, once attached, will be as level as possible. The allowance for vertical misalignment by the pile cap 128a may not require exact precision in making this cut.

Two short bolts 162 are externally threaded such that they mate with two internally threaded nuts 164 to attach the plate 158 to the pile cap 128a through openings 166 in the plate 158. Similarly, two short bolts 168 are externally threaded such that they mate with two internally threaded nuts 170 (only one of which is shown while the other is hidden) to attach the plate 160 to the pile cap 128a through openings 172 (only one of which is shown while the other is hidden) in the plate 160. Once connected, attached or otherwise coupled, the plates 158, 160 may each be adjacent or abutting the internal downward facing surface of the top of the pile cap 128a. During installation, the openings 166, 172 may be drilled through the respective plates 158, 160 at the same time openings are drilled through the top of the pile cap 128a in order to accommodate the short bolts 168. While two short bolts 168 hold each of the vertical piles 124a, 124b to the pile cap 128a, other embodiments may deploy additional bolts and nuts in other locations along the plates 158, 160.

Four long threaded studs 174 are shown extending through the mating plate 134. The four long threaded studs 174 also extend through openings 180 in the top of the body 129 of the pile cap 128. The four long threaded studs 174 also extend through openings (not shown) in the bottom of the body 129 of the pile cap 128. A first pair of leveling nuts 176 may be screwed onto the threads of the four long threaded studs 174 on each side of the mating plate 134 of the column 118a. The leveling nuts 176 may thus be used to ensure that the mating plate 134 is level with the rest of the car port solar array support structure 100, even if the two individual vertical piles 124a, 124b and/or main body 129 of the pile cap 128a is not perfectly level relative to the rest of the car port solar array support structure 100. Each of the leveling nuts 176 may thus be rotated along their respective long threaded stud 174 in order to ensure that the column 118a extends in the desired direction. Additional nuts 178 are also shown which are screwed into the bottom of the long threaded studs 174 on each side of the bottom surface of the main body 129 of the pile cap 128a. While some of the bottom nuts 178 are shown, some are hidden. Thus, each of the long threaded studs 174 includes two additional nuts 178 for holding the long threaded stud 174 in position relative to the bottom surface of the main body 129.

Figure 5:
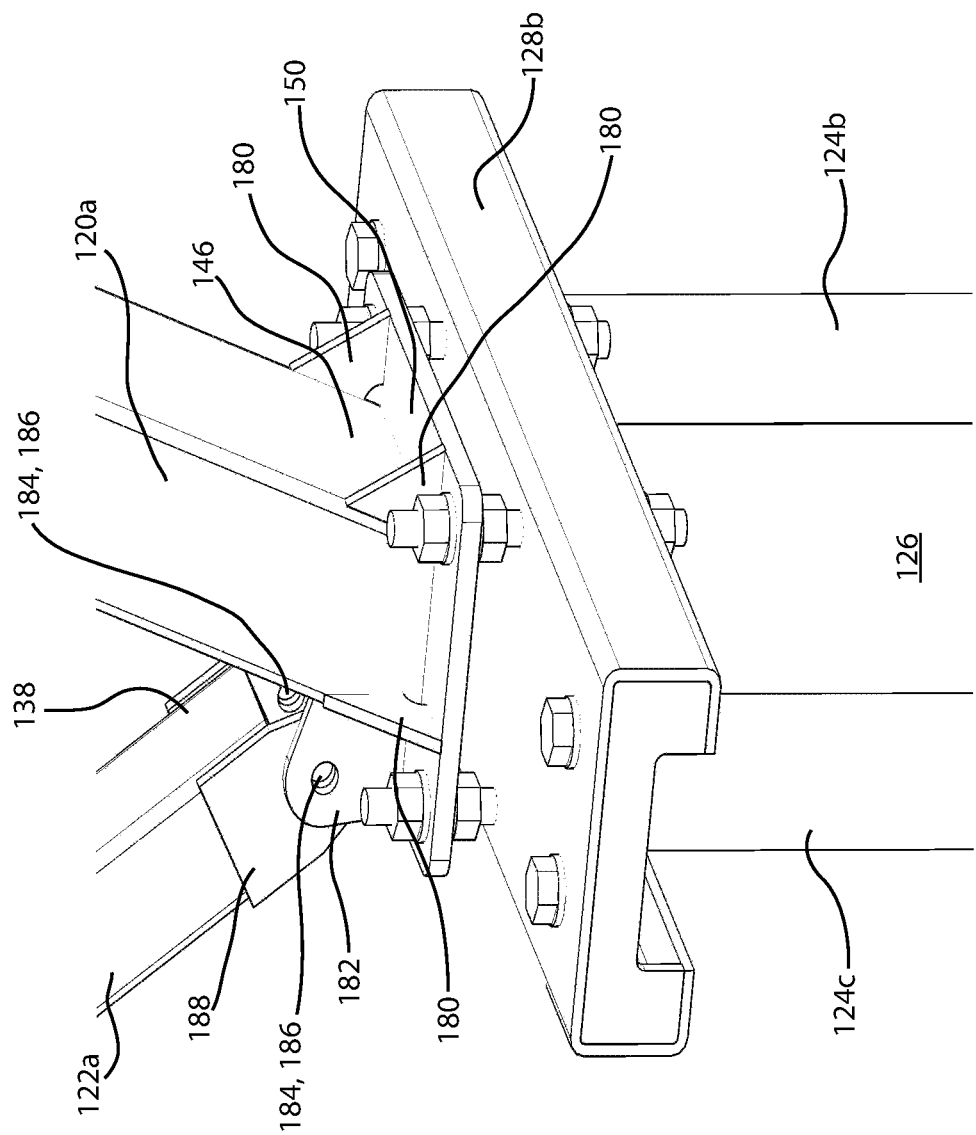
FIG. 5 depicts a perspective view of another pile cap of the car port solar array support structure of FIG. 1, in accordance with one embodiment.

FIG. 5 depicts a perspective view of the pile cap 128b of the car port solar array support structure 100 of FIG. 1, in accordance with one embodiment. The pile cap 128b may include the same structure as the pile cap 128a described hereinabove. FIG. 5 shows that the pile cap 128b may be attached to a different column arrangement. As shown, the pile cap 128b is attached to the columns 120a, 122a. As shown, the bottom end 146 of the second column 120a includes the mating plate 150. The mating plate 150 may be welded or otherwise permanently integrated into the end 146 of the second column 120a. The welding may be reinforced by via weld reinforcement plates 180. The mating plate 150 includes a receiving location 182 that includes two opposing gussets for receiving the bottom end 138 of the third column 122a therebetween. The two opposing gussets of the receiving location 182 may be welded to the end 146 of the second column 120a and the plate 150 and may each include openings 184 which correspond to openings 186 in the bottom end 138 of the third column 122a. The openings 184, 186 are capable of receiving a bolt and nut arrangement therethrough (not shown) to attach the bottom end 138 of the third column 122a to the mating plate 150 and thereby to the second column 120a.

Methods of installing solar array support structures, such as the car port solar array support structure 100, are also contemplated. For example, a method of installing a solar array support structure may include installing a first vertical pile, such as the vertical pile 124a, into a ground and extending from the ground to a first pile end. The method may include installing a second vertical pile, such as the second vertical pile 124b into the ground and extending from the ground to a second pile end, and ensuring the first pile end is aligned vertically with the second pile end. This alignment may be provided by cutting the first and second pile ends to the same vertical height. Then, the method may include attaching a first plate, such as the plate 158, to the first pile end and a second plate, such as the plate 160, to the second pile end, such as via welding.

The method may include attaching the first plate and the second plate to a column cap that extends between each of the first vertical pile and the second vertical pile. This attaching may be accomplished by drilling openings or holes in each of the plates and the column cap and attaching the plates to the pile cap with bolts. Still further, methods include accounting for a misalignment of at least one of the first vertical pile and the second vertical pile by providing for adjustable attachment locations in the column cap for each of the first and second pile ends. This misalignment may be provided for by cutout portions, such as the U-shaped cutout portions 131, in the bottom of the pile cap.

Methods may include attaching a first vertical column to the first pile cap, the first vertical column extending to a bottom column end having a first column plate, such as the first vertical column 118a. Alternatively, methods may include attaching two vertical columns to the first column plate, such as the second and third vertical columns 120a, 122a, wherein the columns extend from the column plate in a V-shape.

Methods may still further include adjusting the level of the first vertical column with a plurality of leveling nuts, such as the leveling nuts 176, located between the first column plate and the first pile cap. Methods still further include creating a first cantilever structure as shown in FIG. 2 by attaching a horizontal beam in a cantilever configuration to the first, second and third columns extending from two pile caps. Methods may include erecting a plurality of cantilever structures, such as the cantilever structures 114a, 114b, 114c to create a solar array support structure in the manner of a car port that can accommodate the parking spaces of one or more vehicles.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A solar array support structure comprising:
   a first vertical pile extending from a ground to a first pile end;
   a second vertical pile extending from the ground to a second pile end; and
   a first pile cap attached to each of the first and second vertical piles, the first pile cap configured to account for a misalignment of at least one of the first vertical pile and the second vertical pile by providing for adjustable attachment locations for each of the first and second pile ends;
   a first vertical column attached to the first pile cap, the first vertical column extending to a bottom column end having a first column plate; and
   wherein a plurality of leveling nuts are located between the first column plate and the first pile cap for attaching the at least one vertical column to the first pile cap.

2. The solar array support structure of claim 1, wherein a first pile plate is attached to the first pile end and a second pile plate is attached to the second pile end, the first and second pile plates providing a surface to bolt each of the first vertical pile and the second vertical pile to the first pile cap.

3. The solar array support structure of claim 1, further comprising:
   a third vertical pile extending from the ground to a third pile end;
   a fourth vertical pile extending from the ground to a fourth pile end;
   a second pile cap attached to each of the third and fourth vertical piles, the second pile cap configured to account for a misalignment of at least one of the first vertical pile and the second vertical pile by providing for adjustable attachment locations for each of the first and second pile ends wherein a third pile plate is attached to the third pile end and a fourth pile plate is attached to the fourth pile end, the third and fourth pile plates providing a surface to bolt each of the third vertical pile and the fourth vertical pile to the second pile cap; and
   a second vertical column and a third vertical column, the second vertical column extending to a bottom column end having a second column plate wherein the second column plate includes a second mounting structure for attaching the third vertical column to the second column plate, wherein the second vertical column and the third vertical column extend from the column plate in a V-shape.

4. The solar array support structure of claim 3, wherein the first vertical column extends from the first column plate at the first column end to a first beam attachment plate at a top column end, the first beam attachment plate configured to facilitate attachment of a horizontal beam.

5. The solar array support structure of claim 4, wherein a top of the third vertical column extends to a top of the first vertical column, and wherein the second vertical column extends from the second column plate at the bottom column end to a second beam attachment plate configured to facilitate attachment of the horizontal beam.

6. The solar array support structure of claim 5, further comprising: the horizontal beam attached to each of the first beam attachment plate of the first vertical column and the second beam attachment plate of the second vertical column, wherein the horizontal beam includes a substantial length that extends past the second vertical column distal to the first vertical column.

7. The solar array support structure of claim 6, wherein the first vertical pile, the second vertical pile, the first pile cap, the first vertical column, the third vertical pile, the fourth vertical pile, the second pile cap, the second vertical column, the third vertical column, and the horizontal beam comprise a first cantilever structure, the solar array support structure further comprising:
   a second cantilever structure comprised of the same structure as the first cantilever structure; and
   a plurality of rails spaced apart along a length of each of the first and second horizontal beams and extending between the horizontal beams of the first and second cantilever structures, the plurality of rails configured to receive an attachable array of solar panels thereon.

8. A solar array support structure comprising:
   a first vertical column extending between a top end and a bottom end;
   a second vertical column extending between a top end and a bottom end;
   a third vertical column extending between a top end and a bottom end, wherein the third vertical column extends between the top end of the first vertical column and the bottom end of the second vertical column;
   a horizontal beam attached to and extending a length between a first end and a second end, the length extending across the top ends of each of the first, second and third vertical columns;
   a solar array mounted above the horizontal beam;
   a first vertical pile extending from a ground to a first pile end;
   a second vertical pile extending from the ground to a second pile end;
   a first pile cap attached to each of the first and second vertical piles, the bottom end of the first vertical column attached to the first pile cap;
   a third vertical pile extending from the ground to a third pile end;
   a fourth vertical pile extending from the ground to a fourth pile end; and a second pile cap attached to each of the third and fourth vertical piles, the bottom end of each of the second and third vertical columns attached to the second pile cap.

9. The solar array support structure of claim 8, wherein the first and second vertical piles are located in a vertical plane that extends perpendicular from a second vertical plane that extends along the length of the horizontal beam.

10. The solar array support structure of claim 8, wherein the length of the horizontal beam extends past the second vertical column distal to the first vertical column.

11. The solar array support structure of claim 10, wherein the first vertical pile, the second vertical pile, the first pile cap, the first vertical column, the third vertical pile, the fourth vertical pile, the second pile cap, the second vertical column, the third vertical column, and the horizontal beam comprise a first cantilever structure, the solar array support structure further comprising:
   a second cantilever structure comprised of the same structure as the first cantilever structure; and
   a plurality of rails spaced apart along a length of each of the horizontal beams and extending between the first and second horizontal beams of the first and second cantilever structures, the plurality of rails configured to receive an attachable array of solar panels thereon.

12. The solar array support structure of claim 10, wherein the first and second cantilever structures are dimensioned to create a carport space between the first and second cantilever structures.

13. The solar array support structure of claim 12, further comprising a third cantilever structure comprised of the same structure as the first and second cantilever structures, wherein the plurality of rails extend between the horizontal beams of each of the first and third cantilever structures, wherein the second and third cantilever structures are dimensioned to create a second carport space between the second and third cantilever structures.

14. A method of installing a solar array support structure comprising:
   installing a first vertical pile into a ground and extending from the ground to a first pile end;
   installing a second vertical pile into the ground and extending from the ground to a second pile end;
   ensuring the first pile end is aligned vertically with the second pile end;
   attaching a first plate to the first pile end and a second plate to the second pile end; and
   attaching the first plate and the second plate to a column cap that extends between each of the first vertical pile and the second vertical pile.

15. The method of claim 14, further comprising accounting for a misalignment of at least one of the first vertical pile and the second vertical pile by providing for adjustable attachment locations in the column cap for each of the first and second pile ends.

16. The method of claim 15, further comprising attaching a first vertical column to the first pile cap, the first vertical column extending to a bottom column end having a first column plate.

17. The method of claim 16, adjusting the level of the first vertical column with a plurality of leveling nuts located between the first column plate and the first pile cap.

18. The method of claim 17, further comprising attaching a second vertical column to the first column plate, wherein the first vertical column and the second vertical column extend from the column plate in a V-shape.

\* \* \* \* \*